UNITED STATES PATENT OFFICE 2,593,798

AMINOALKYLAMINO ISOQUINOLINE COMPOUNDS

Richard A. Robinson, Morton Grove, Ill., assignor to G. D. Searle & Co., Skokie, Ill., a corporation of Illinois No Drawing. Application May 22, 1947, Serial No. 749,873

20 Claims. (Cl. 260—286)

This invention relates to a series of aminoalkylamino derivatives of isoquinoline and to processes for preparing the same. In particular it relates to isoquinoline compounds which are substituted by secondary- and tertiary-aliphatic-aminoalkylamino radicals and which may be further substituted by one or more radicals such as halo, alkoxy, cyano, nitro and amino groups.

The compounds are of the following formula:

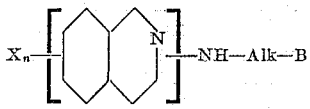

wherein X is halogen, ether, nitro, cyano, substituted and unsubstituted amino and/or a similar radical, Alk is an alkylene group (containing from two to nine carbon atoms), B is an aliphatic-type amino group, and $n$ is a whole number from 0 to 3.

It will be observed that the substituents represented by X and NH-Alk-B may be located in either ring of the isoquinoline nucleus without regard to each other except when $X_2$ represents a methylenedioxy group, in which case the methylenedioxy linkages must necessarily be located in adjacent positions in the same ring. It is to be understood that the term "alkylene group" as used in this specification and appended claims refers to an aliphatic hydrocarbon group (which may have either a straight or a branched chain) with two open valence bonds, each located upon a separate carbon atom, to which the nitrogen atoms shown in the formula are attached. The alkylene radicals include ethylene, propylene, trimethylene, butylene, amylene, propylene, and heptylene, as well as related alkylated derivatives thereof. The amino group, B, is derived from primary and secondary aliphatic and aliphatic-type amines such as mono- and dialkylamines; cyclic amines such as piperidine, pyrrolidine, and alkyl derivatives thereof; aliphatic-type heterocyclic amines such as morpholine, thiomorpholine, piperazine, and related compounds. The amino groups which are within the purview of this invention are derived from organic bases which have ionization constants in the range of $10^{-3}$ to $10^{-6}$.

The compounds of this invention wherein the aminoalkylamino group is located at the 1-position of the isoquinoline nucleus may conveniently be prepared by the reaction of an appropriate dialkylaminoalkylamine upon an isoquinoline derivative, which has a chlorine (or bromine) atom substituted in the 1-position, and such other substituent or substituents elsewhere in the nucleus as may be desirable to have in the final compound. Unlike halogen atoms substituted in many aromatic nuclei, a chlorine (or bromine) atom in the position specified is sufficiently reactive to react with a primary amino group at not unreasonably elevated temperatures. When more than one halogen atom is present in the starting material, the halogen atom in position 1 appears to be preferentially reactive. The reaction is readily effected by heating a simple mixture of the reactants to a temperature in the range of 150° to 200° centigrade, depending upon the individual reactivities of the reactants. In practice I have found that best results are obtained when 2 moles of the aminoalkylamine are reacted with 1 mole of the 1-haloisoquinoline. The product thus formed is treated with aqueous alkali, the free base thus liberated is separated and purified if desired, and ordinarily is converted to a salt as the final step, all by methods conventionally used for such operations. The chlorine in the 1-position may be replaced by either bromine or iodine, though the relative ease of preparation of the 1-chloroisoquinolines and the facility with which they react in the present invention makes such substitution ordinarily undesirable. The reaction of such 1-bromo- or 1-iodoisoquinolines with the required amines will be somewhat more energetic than in the case of the corresponding 1-chloroisoquinolines, and will in general require heating to a somewhat lower temperature than indicated in the examples.

The compounds wherein the aminoalkylamino group is located at positions other than the 1-position of the isoquinoline nucleus can be prepared by a modified Bücherer-type reaction. This involves the treatment of a hydroxyisoquinoline with an amine such as ammonia or an aminoalkylamine and sulfur dioxide or other sulfite, such as ammonium sulfite, sodium bisulfite and their equivalents, at temperatures in the range of 100° to 200° C. The reaction may be carried out at reflux temperature when non-volatile amines are used. The hydroxyl group is replaced by an amino or substituted amino group and the base is isolated by alkalization, extraction, steam distillation or other separation procedures.

The free bases are normally high-boiling oils which can, in some instances, be purified by distillation at low pressures. They are difficultly soluble in water, but soluble in most organic solvents. They are divalent bases; that is, they will form salts with one or two equivalents of an acid. The di-acid salts are generally crystalline solids, in many instances are readily soluble in water, less soluble in alcohols, and sparingly soluble, if at all, in other organic solvents. They are conveniently prepared by dissolving the base in a solvent such as acetone and neutralizing this solution with the correct amount of an alcoholic solution of the acid. While hydrochloric acid is frequently used for this purpose, other acids, mineral or organic, may also be used if desired. Among such acids are sulfuric, phosphoric, sulfamic, hydrochloric, hydrobromic, tartaric, citric, lactic, acetic, oxalic and similar acids. It is to be understood that the appended claims are intended to include the basic compounds claimed therein whether they be made or used as the free base or as a salt thereof.

1-chloroisoquinoline and many of the mono- and di-substitution products thereof necessary for the preparation of the compounds described and claimed herein are well-known compounds whose preparation has been adequately described in the prior art. Generally speaking, any isoquinoline derivative whose 1-position is not substituted and which has elsewhere in the nucleus one or two substituents chosen from among those listed earlier in this specification, can be converted into the corresponding 1-chloro derivative as follows: The compound is treated with perphthalic acid (or other equivalent oxidizing agent) to form the corresponding isoquinoline N-oxide. This oxide, upon treatment with boiling phosphorus oxychloride, reacts and rearranges to form the desired 1-chloro derivative of the original substituted isoquinoline, from which the amino compounds claimed in this invention can be made by the methods cited and illustrated in the examples.

As another method of obtaining the necessary substituted 1-chloroisoquinolines for preparing the compounds of this invention, the corresponding substituted 1-hydroxyisoquinolines (or isocarbostyrils) may be treated with hot phosphorus oxychloride to yield the desired 1-chloroisoquinoline derivatives.

The aminoalkylamino isoquinolines to which this invention relates are useful as intermediates in the preparation of pharmaceuticals, pesticides, dyes, antiseptics, surface-active agents, antioxidants, and more complex organic products. Certain of these substances have value as internal parasiticides, pharmaceuticals, and as chemotherapeutic agents.

The following examples are cited as specific instances of the manner of preparation of the compounds described and claimed herein, but are not intended in any way to limit this invention. The dialkylaminoalkylaminoisoquinoline derivatives which contain nuclear halogen and alkoxyl substituents are disclosed and claimed in my copending application Serial No. 271,970, filed February 16, 1952.

*Example 1*

A mixture of 25 grams of 1-chloroisoquinoline and 32 g. of delta-diethylamino-alpha-methylbutylamine is heated at 190–200° C. for two hours. After cooling, the mass is treated with water in which is dissolved an excess of sodium hydroxide, and the bases thus liberated are extracted with ether. After removal of the solvent, the residue is distilled at reduced pressure, the desired 1 - (delta - diethylamino - alpha - methylbutyl- amino)-isoquinoline distilling at 180–185° C. at 2 millimeters pressure. This may be converted to its dihydrochloride by dissolving the base in acetone and adding an alcoholic solution of hydrogen chloride containing two equivalents of acid for each mol of base taken. Crystallization is facilitated by adding sufficient water to permit formation of a dihydrate. The crystals of 1 - (delta - diethylamino - alpha - methylbutylamino)-isoquinoline dihydrochloride dihydrate thus formed melt at about 95–100° C.

*Example 2*

When 26 g. of gamma-diethylaminopropylamine is used in place of the amine in Example 1, a vigorous exothermic reaction takes place at 190° C. The temperature is prevented from going beyond 210° C. by external cooling. The free base, obtained as described above, distils at 185–192° C. at 3 mm. pressure. 1-(gamma-diethylaminopropylamino)isoquinoline dihydrochloride monohydrate separates from a mixture of acetone and alcohol as small crystals which melt at 125° C.

*Example 3*

When 48 g. of gamma-di-n-hexylaminopropylamine is used in place of the amine specified in Example 1, a smooth reaction sets in upon heating, resulting in the formation of 1-(gamma-di-n-hexylaminopropylamino)isoquinoline, which is most conveniently isolated, as described in Examples 1 and 2, as the dihydrochloride monohydrate which melts at 163° C.

Similarly, an equivalent amount of gamma-di-n-butylaminopropylamine used in place of the amine of Example 3 yields the corresponding 1-(gamma - di - n - butylaminopropylamino)isoquinoline (melting point of the dihydrochloride 135° C.); in a similar reaction, delta-diethylaminobutylamine yields 1-(delta-diethylaminobutylamino)isoquinoline (melting point of the dihydrochloride 90° C.). Still other dialkylaminoalkylamines may be used in place of those named above, each yielding the corresponding substituted isoquinoline.

Substituted 1-chloroisoquinolines may also be used in place of the 1-chloroisoquinoline specified in Examples 1, 2 and 3, as shown in the following examples.

*Example 4*

40 g. of 1,3-dichloroisoquinoline and 52 g. of gamma-diethylaminopropylamine are heated together to 150° C. At this point a vigorous reaction sets in, and external cooling is used to prevent temperature rise above 160° C. The temperature is maintained in this range for fifteen minutes. The product is converted to the free base as in Example 1, and the base fraction heated at 100° C. and 10 mm. pressure to remove volatile constituents. The residue is dissolved in ether, and the calculated quantity of alcoholic hydrogen chloride added to form 1-(gamma-diethylaminopropylamino)-3 - chloroisoquinoline dihydrochloride. The precipitated salt may be purified by treatment with hot acetone, and when pure, forms white crystals which melt at 120–125° C.

By a similar reaction of 1,4-dichloroisoquinoline and delta-diethylamino-alpha-methylbutylamine, there is obtained 4-chloro-1-(delta-diethylamino -alpha - methylbutylamino)isoquinoline which is a light-colored oil boiling at about 180° C. at 0.35 mm. pressure.

Example 5

When 1,5- or 1,7-dichloroisoquinoline is treated as described in Example 4 for the 1,3-isomer, the corresponding 5-chloro-1-(gamma-diethylaminopropylamino)isoquinoline or 7-chloro-1-(gamma - diethylaminopropylamino)isoquinoline is obtained, in each case as the dihydrochloride of melting point 227° C. (5-chloro isomer) or 161° C. (7-chloro isomer). These are more advantageously purified by crystallization from isopropanol than from acetone as described in Example 4.

Reaction of 1,5-dichloroisoquinoline with delta-diethylamino-alpha-methylbutylamine gives 5-chloro - 1 -(delta-diethylamino-alpha-methylbutylamino)isoquinoline. The latter is a viscous high-boiling oil which forms a crystalline phosphate of M. P. about 110° C. In a similar manner there is prepared 8-chloro-1-(delta-diethyl-amino-alpha - methylbutylamino)isoquinoline which forms a phosphate melting at about 152° C.

Example 6

A mixture of 13.5 g. of 1-chloro-7-methoxyisoquinoline and 20 g. of gamma-diethylaminopropylamine is heated for two hours at 175–180° C. under a reflux condenser. After cooling, the mass is dissolved in dilute hydrochloric acid, decolorized with charcoal, and the organic bases liberated by addition of aqueous sodium hydroxide. The bases are isolated and heated at 100–110° C. and 5 mm. pressure to remove volatile constituents. The residue is dissolved in acetone, and a solution of two equivalents of hydrogen chloride in absolute alcohol added, followed by cautious addition of water until no more precipitate forms. The 7-methoxy-1-(gamma - diethylaminopropylamino)isoquinoline dihydrochloride hydrate thus formed is conveniently purified by crystallization from a mixture of acetone and isopropanol, and when substantially pure, melts at 120° C.

In an exactly analogous manner, 1-chloro-6,7-dimethoxyisoquinoline, 1-chloro-6,7-methylenedioxyisoquinoline, 1-chloro-6-cyanoisoquinoline, 1-chloro-7-cyanoisoquinoline, 1,5-dichloro-7-butoxyisoquinoline and other mono- and disubstituted 1-chloro isoquinolines may be converted into the corresponding 1-(dialkylaminoalkylamino) derivatives conveniently.

Using 1-chloro-5-methoxyisoquinoline in place of 1-chloro-7-methoxyisoquinoline of Example 6, there is obtained 5-methoxy-1-(gamma-diethylaminopropylamino)isoquinoline, a viscous, light-colored oil, which forms a dihydrochloride of M. P. 232° C. Similarly one can prepare 6-methoxy - 1 -(gamma-diethylaminopropylamino)isoquinoline dihydrochloride, which melts at about 184° C.

Example 7

14.5 g. of 7-hydroxyisoquinoline, 45 g. of gamma-diethylaminopropylamine, 100 milliliters of water and 12.8 g. of sulfur dioxide are refluxed under a pressure of 3 inches of mercury for 36 hours. The aminoalkylated isoquinoline which separates as a yellow oil is isolated by ether extraction. The product is purified by distillation; B. P. 200° C. at 3 mm. of pressure. The base is converted to the dihydrochloride in the usual way. The dihydrochloride crystallizes readily and is purified by recrystallization from isopropanol in which it is moderately soluble. The 7-(gamma - diethylaminopropylamino)-isoquinoline dihydrochloride consists of yellow needles, M. P. 145° C.

Example 8

59 g. of 5-hydroxyisoquinoline (M. P. 230° C.), 179 g. of gamma-diethylaminopropylamine, 300 g. of water and 39 g. of sulfur dioxide are refluxed under a pressure of 12 in. mercury for 55 hours. The 5-(gamma-diethylaminopropylamino)-isoquinoline which separates slowly as an oily layer is isolated as in Example 7 and converted to the dihydrochloride. The dihydrochloride hydrate of 5-(gamma-diethylaminopropylamino)-isoquinoline is a yellow crystalline substance of M. P. 85° C. The dihydrobromide and picrate, prepared in the usual way, both melt at 195° C.

Example 9

To 78 g. of isoquinoline sulfate (M. P. 206° C.), preheated to 300° C. is added 60 g. of 60% oleum during 5 minutes. The mixture is heated 5 minutes longer at 300° C. A solution of the calcium salts in a volume of 1500 ml. is prepared in the usual way. The volume is reduced to 175 ml. and then allowed to cool. 30 g. of calcium isoquinoline-5-sulfonate crystallizes at this volume. The filtrate is treated with sodium carbonate until alkaline to phenolphthalein. The calcium carbonate is removed and the filtrate evaporated to dryness. 55 g. of sodium isoquinoline-8-sulfonate is obtained. This sodium salt is mixed with 160 g. of sodium hydroxide and 50 ml. of water and fused at 210° C. for 10 minutes (the mixture is stirred during the fusion). The mixture is dissolved in one liter of water and treated with concentrated hydrochloric acid until just alkaline to litmus. The precipitated 8-hydroxyisoquinoline is filtered and washed with 50 ml. of hot water. The crude material is dissolved in hot dilute hydrochloric acid and filtered from a small quantity of insoluble material. 10 g. of the hydrochloride, M. P. about 240° C., crystallizes from 60 ml. of dilute hydrochloric acid containing 15 ml. of concentrated hydrochloric acid. The hydrochloride is recrystallized from 28 ml. of dilute hydrochloric acid containing 5 ml. of concentrated hydrochloric acid; M. P. 244° C. The base obtained from this salt melts at 210° C. Purification by sublimation and recrystallization from ethanol yields the pure 8-hydroxyisoquinoline, M. P. 213° C. The picrate melts at 285° C. A mixture of the base with 6-hydroxyisoquinoline of M. P. 220° C. melts at 165° C.

20 g. of 8-hydroxyisoquinoline M. P. 213° C., 120 g. of gamma-diethylaminopropylamine, 150 ml. of water and 30 g. of sulfur dioxide are heated to reflux temperature under a pressure of 3 in. mercury for 36 hours. The product is isolated by ether extraction and heated at low pressure to expel any low-boiling bases. 17½ g. of oily residue is converted to the dihydrochloride which is purified by recrystallization from ethanol. The product, yellow crystals of M. P. 231° C., is difficultly soluble in alcohols or acetone.

Example 10

10 g. of 8-hydroxyisoquinoline, 60 ml. of concentrated ammonium hydroxide and 14 g. of sulfur dioxide are heated under pressure at 150–160° C. for 6 hours. On working up by the customary method aminoisoquinoline of M. P. 173° C. is obtained. The pure substance, from benzene, melts at 174° C.

Example 11

A mixture of 17.5 g. of 1-chloroisoquinoline and 40 g. of omega-diethylaminoheptylamine (B. P. 100° C. at 3 mm.) is heated and agitated at 140° C. for 10 minutes, at 165° C. for 20 minutes and finally at 185° C. for 10 minutes. The charge crystallizes on cooling. It is taken up in dilute hydrochloric acid, treated with charcoal and filtered. The filtrate is made alkaline with caustic soda and the organic bases are extracted. The extract is dried with caustic soda pellets and evaporated under vacuum, the final conditions being 110° C. and 3 mm. pressure. The resulting 1 - (omega - diethylaminoheptylamino)-isoquinoline is distilled; B. P. 210° C. (0.25 mm.). It forms an oxalate which, after recrystallization from methanol, melts at about 151° C.

Example 12

Using a procedure like that of Example 11, but employing gamma - (gamma - diethylaminopropylamino)propylamine instead of omega-diethylaminoheptylamine, one obtains a good yield of a base which is probably 1-gamma-(gamma-diethylaminopropylamino) propylaminoisoquinoline. The latter forms a trihydrochloride which melts at about 140° C.

I claim:

1. A member of the group consisting of an aminoalkylaminoisoquinoline and salts thereof, said aminoalkylaminoisoquinoline having the structural formula

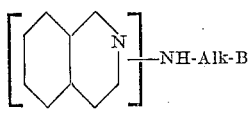

wherein Alk is a lower alkylene radical and B is a di(lower alkyl) amino radical.

2. A salt of 1-(γ-diethylaminopropylamino)-isoquinoline.

3. A salt of a 1-(dialkylaminoalkylamino)isoquinoline, having the structural formula

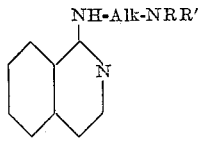

wherein Alk is a lower alkylene radical and R and R' are lower alkyl radicals.

4. A salt of a 1-(dialkylaminopropylamino)-isoquinoline having the structural formula

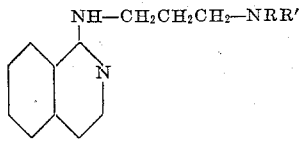

wherein R and R' are lower alkyl radicals.

5. 1-(γ- diethylaminopropylamino) isoquinoline dihydrochloride.

6. 1-(δ-diethylamino-α-methylbutylamino)isoquinoline dihydrochloride.

7. A salt of a 7-(dialkylaminoalkylamino)isoquinoline having the structural formula

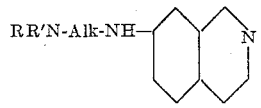

wherein Alk is a lower alkylene radical and R and R' are lower alkyl radicals.

8. A salt of a 7-(dialkylaminopropylamino)isoquinoline having the structural formula

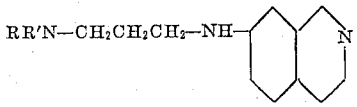

wherein R and R' are lower alkyl radicals.

9. A salt of 7-(γ-diethylaminopropylamino)-isoquinoline.

10. 7 -(γ - diethylaminopropylamino) isoquinoline dihydrochloride.

11. A salt of an 8-(dialkylaminoalkylamino)-isoquinoline having the structural formula

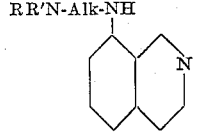

wherein Alk is a lower alkylene radical and R and R' are lower alkyl radicals.

12. A salt of an 8-(dialkylaminopropylamino)-isoquinoline having the structural formula

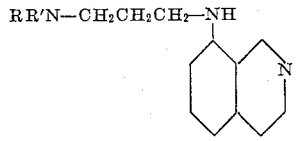

wherein R and R' are lower alkyl radicals.

13. A salt of an 8-(γ-diethylaminopropylamino)isoquinoline.

14. 8-(γ - diethylaminopropylamino) isoquinoline dihydrochloride.

15. A salt of a 5-(dialkylaminoalkylamino)-isoquinoline having the structural formula

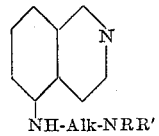

wherein Alk is a lower alkylene radical and R and R' are lower alkyl radicals.

16. A salt of a 5-(dialkylaminopropylamino)-isoquinoline having the structural formula

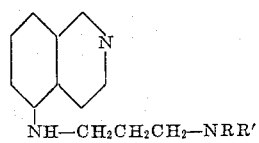

wherein R and R' are lower alkyl radicals.

17. A salt of a 5-(γ-diethylaminopropylamino) isoquinoline.

18. 5 - (γ-diethylamino-propylamino) isoquinoline dihydrochloride.

19. A salt of a 1-(δ-dialkylamino-α-methylbutylamino) isoquinoline having the structural formula

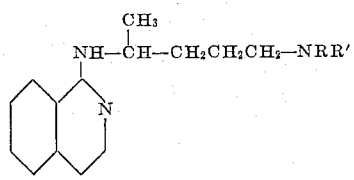

wherein R and R' are lower alkyl radicals.

20. A salt of a 1-(δ-diethylamino-α-methylbutylamino) isoquinoline.

RICHARD A. ROBINSON.

(References on following page)

REFERENCES CITED

The following references are of record in the file of this patent:

UNITED STATES PATENTS

| Number | Name | Date |
|---|---|---|
| 1,886,481 | Hartmann et al. | Nov. 8, 1932 |
| 2,231,612 | Boeseken et al. | Feb. 11, 1941 |

FOREIGN PATENTS

| Number | Country | Date |
|---|---|---|
| 151,888 | Switzerland | Apr. 1, 1932 |
| 448,502 | Great Britain | May 28, 1936 |

OTHER REFERENCES

Adams et al.: "Organic Reactions," vol. I, p. 110 (John Wiley, New York, 1942).

Woroshtzow et al.: Ber., vol. 65, pp. 142–145 (1932).

Wiselogle: "Survey of Antimalarial Drugs, 1941–1945," pp. 1306–1308 (J. W. Edwards, Ann Arbor, Mich., 1946).